United States Patent Office 3,557,609
Patented Jan. 26, 1971

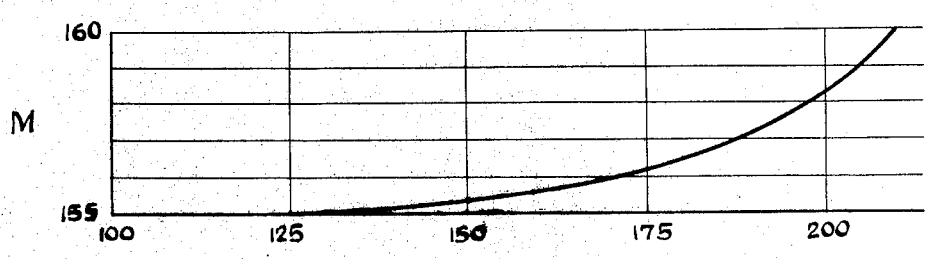

3,557,609
METHOD AND APPARATUS FOR MONITORING THE PARAFFINICITY CHARACTERIZATION OF HYDROCARBON MIXTURES
Robert A. Woodle, Nederland, Tex., assignor to Texaco Inc., New York, N.Y., a corporation of Delaware
Filed Mar. 27, 1969, Ser. No. 811,056
Int. Cl. G01n *11/00, 33/26*
U.S. Cl. 73—53                    15 Claims

ABSTRACT OF THE DISCLOSURE

A method for determining the Watson-Nelson characterization factor of hydrocarbons wherein the viscosity and gravity are sensed providing first and second signals, respectively, corresponding to the Saybolt viscosity and API gravity. The signals are then combined in accordance with the following equation:

$$K = A + BG + \frac{C}{V_s}$$

where:

$K$ = the Watson-Nelson characterization factor of the hydrocarbon mixture; $V_s$ = the Saybolt Universal viscosity of the hydrocarbon mixture;
$G$ = the API gravity of the hydrocarbon mixture at 60° F.; and A, B, and C are predetermined constants.

BACKGROUND OF THE INVENTION

This invention relates to methods and apparatus for the characterization of a hydrocarbon mixture in accordance with its paraffinicity. In one of its more specific aspects, this invention relates to a method and apparatus for monitoring the Watson-Nelson characterization factor of hydrocarbon mixtures.

The Watson-Nelson characterization factor, K, is a very useful tool for describing by one numerical quantity the relative paraffinicity of a petroleum crude oil or a fraction thereof. It was first described in the literature in 1933 in Ind. Eng. Chem., vol. 25, page 880, by its originators, who observed an empirical relationship between specific gravity and average boiling point of different boiling range fractions from a given crude oil. This observation led to the development of the equation:

$$K = \frac{\sqrt[3]{T_B}}{s} \qquad (1)$$

wherein:

$K$ = Watson-Nelson characterization factor;
$T_B$ = average boiling point, ° R; and
$s$ = specific gravity at 60° F.

In general, the characterization factor is useful because it correlates with the average hydrocarbon type analysis, or quality of an oil. Thus, for example, the characterization factor can be used to distinguish a heavy oil of one crude from a similar oil of a different crude, a refined oil from the parent charge stock, and a higher VI (viscosity index) refined oil from a lower VI refined oil, both prepared from the same parent oil. Accordingly, it is extremely useful to continuously monitor the characterization factor of refinery process streams to distinguish among products, and to detect changes which occur during processing. For example, changes which can be detected include changes in crude oil quality or composition supplied to crude stills, changes in charge stock quality to refining or deasphalting processes, and changes in product oil quality from refining or deasphalting processes. Thus, the characterization factor can be used as the basis for control of various refinery operations.

Given the required data, i.e., the average boiling point and the specific gravity, it is relatively easy to calculate K in accordance with the above equation. However, the average boiling point is not a property that lends itself readily to continuous on-stream measurements. In fact, for very heavy oils, it is very difficult and sometimes impossible, to determine the average boiling point of the oil.

In accordance with the invention disclosed herein, I have provided the capability for the continuous on-stream determination of the Watson-Nelson characterization factor whereby various petroleum refining processes can be monitored or controlled automatically, or by computer, resulting in improved product quality and economy.

SUMMARY

Briefly stated, one aspect of the invention resides in a method for monitoring the Watson-Nelson characterization factor of a hydrocarbon mixture. In accordance with this aspect of the invention, the method includes the steps of sensing a physical property of the hydrocarbon mixture representative of its viscosity, providing a first signal corresponding thereto, sensing a second physical property of the hydrocarbon mixture representative of its gravity, e.g., density, API gravity, or specific gravity, and providing a second signal corresponding thereto, and combining the first and second signals to provide a third signal corresponding to the Watson-Nelson characterization factor of the hydrocarbon mixture. The latter step is performed in accordance with an empirical mathematical relationship, hereinafter disclosed, relating the aforementioned characterization factor with the viscosity and the gravity of the mixture.

In a preferred embodiment of the method of the invention, the aforementioned first signal is provided in a manner to represent the Saybolt Universal viscosity of the hydrocarbon mixture, and the second signal is provided in a manner to represent the API gravity of the mixture. In this embodiment of the invention the aforementioned empirical relationship is an equation in the form wherein the characterization factor is equal to the sum of at least three terms, one term being a constant, another term being the product of a constant and the API gravity, and a term being the quotient of a constant divided by the Saybolt Universal viscosity. The above constants are shown to be related to the temperature of the hydrocarbon mixture during the aforementioned physical property sensing steps.

In yet a further embodiment of the invention, the gravity signal providing step includes the steps of sensing the specific gravity of the hydrocarbon mixture, providing a specific gravity signal corresponding thereto and in response to this signal providing an API gravity signal corresponding to the API gravity of the mixture. The latter signal is provided in accordance with a mathematical relationship relating API gravity with the sensed specific gravity. Further, in this embodiment of the invention the aforementioned viscosity signal providing step includes the steps of sensing the absolute viscosity of the mixture, providing a viscosity signal corresponding thereto, and in response to the latter signal providing the aforementioned Saybolt viscosity signal in accordance with a mathematical relationship relating Saybolt Universal viscosity with the sensed absolute viscosity.

In accordance with another aspect of the invention there is provided apparatus in combination for monitoring the Watson-Nelson characterization factor of the hydrocarbon mixture. The apparatus includes first means for sensing the viscosity of the mixture and for providing a first signal representative thereof, and second means for sensing the gravity of the mixture and for providing a second signal representative thereof. The apparatus further includes signal combining means, including computation elements, responsive to the first and second signals, for providing a third signal representative of the characterization factor in accordance with an empirical relationship relating the characterization factor with the viscosity and gravity of the mixture. In a preferred embodiment of the apparatus the first and second sensing means, respectively include, a viscosity sensor, and a specific gravity sensor. Also provided in this embodiment are computing means coupled with the sensors for providing signals corresponding to the Saybolt Universal viscosity and the API gravity of the mixture in accordance with mathematical relationships relating, respectively, the latter physical properties with the sensed viscosity and specific gravity. Also, in this embodiment, the computational elements for computing the characterization factor are adapted to perform the computation in accordance with the aforementioned empirical relationship, wherein, the Watson-Nelson charactrization factor is computed using the signals of the Saybolt Universal viscosity and the API gravity of the hydrocarbon mixture.

In view of the foregoing it is an object of the invention to provide an improved method for monitoring the Watson-Nelson characterization factor of hydrocarbon mixtures.

Another object of the invention is to provide a simplified method for monitoring the Watson-Nelson characterization factor of hydrocarbon mixtures suitable for on-stream use.

Another object of the invention is to provide a simplified method for monitoring the Watson-Nelson characterization factor by monitoring the viscosity and gravity of the mixture and by relating said characterization factor to the monitored viscosity and gravity.

Another object of the invention is to provide embodiments of apparatus to fulfill the aforementioned objectives.

These and other objects, advantages and features of the invention, will be more fully understood by referring to the following descriptions and claims, taken in conjunction with the accompanying drawings.

BRIEF DESCRIPTION OF THE DRAWINGS

FIGS. 2 through 7, inclusive, are graphs of the quantities A, B, C, R, W, and M, respectively, plotted against the temperature of the hydrocarbon stream.

DESCRIPTION OF THE PREFERRED EMBODIMENTS

Figure 1:
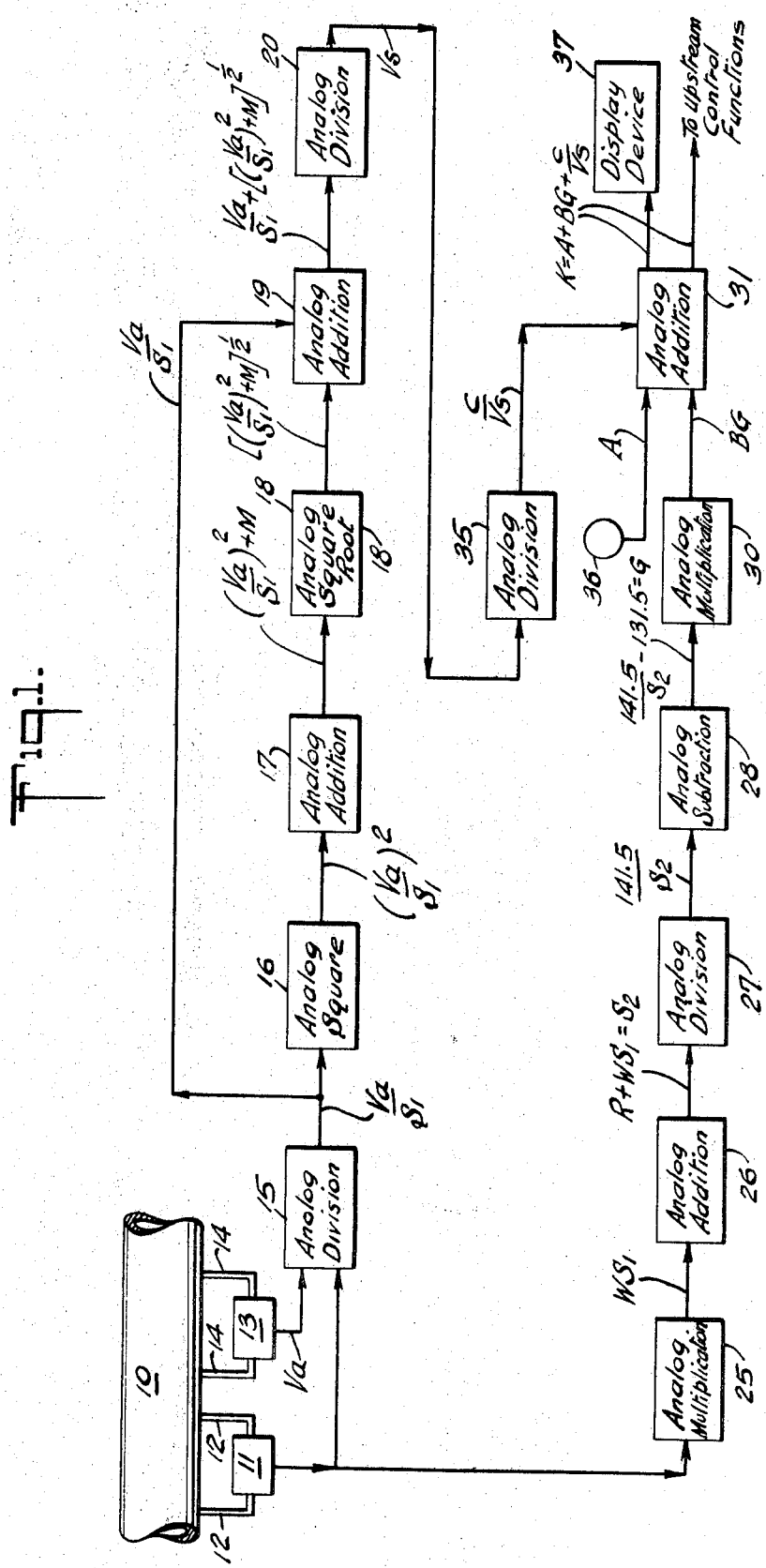
FIG. 1 is a schematic block diagram illustrating an example of a system which can be used to practice the invention for continuously monitoring the Watson-Nelson characterization factor of a hydrocarbon stream.

Oils having the same viscosity and density have the same Watson-Nelson characterization factor K. In the analysis and correlation of empirical data of viscosity and density, and characterization factor computed in accordance with Equation 1 above, I have learned that the Watson-Nelson characterization factor can be mathematically expressed in terms of the density and viscosity of the hydrocarbon mixture. The following tables are abbreviated examples of the data which supports this conclusion. The tables are prepared in reference to three temperatures of the hydrocarbon mixtures. Data at intermediate points and at intermediate temperatures exhibit the same trends as the data shown in the tables.

TABLE I.—HYDROCARBON MIXTURE AT 100° F.

| K | Viscosity SUS | Gravity, °API | K | Viscosity SUS | Gravity, °API |
|---|---|---|---|---|---|
| 10.5 | 37 | 18.9 | 12.0 | 37 | 39.0 |
|  | 100 | 11.1 |  | 100 | 29.6 |
|  | 1,000 | 5.8 |  | 1,000 | 23.2 |
| 11.0 | 37 | 25.3 | 12.5 | 37 | 45.4 |
|  | 100 | 17.3 |  | 100 | 35.1 |
|  | 1,000 | 12.0 |  | 1,000 | 28.4 |

TABLE II.—HYDROCARBON MIXTURE AT 122° F.

| K | Viscosity SUS | Gravity, °API | K | Viscosity SUS | Gravity, °API |
|---|---|---|---|---|---|
| 10.5 | 37 | 16.6 | 12.0 | 37 | 38.0 |
|  | 100 | 8.1 |  | 100 | 27.3 |
|  | 1,000 | 5.0 |  | 1,000 | 21.8 |
| 11.0 | 37 | 23.8 | 12.5 | 37 | 44.3 |
|  | 100 | 15.2 |  | 100 | 33.0 |
|  | 1,000 | 10.5 |  | 1,000 | 27.1 |

TABLE III.—HYDROCARBON MIXTURE AT 210° F.

| K | Viscosity SUS | Gravity, °API | K | Viscosity SUS | Gravity, °API |
|---|---|---|---|---|---|
| 10.5 | 37 | 11.0 | 12.0 | 37 | 30.1 |
|  | 100 | 3.8 |  | 100 | 21.8 |
|  |  |  |  | 1,000 | 16.8 |
| 11.0 | 37 | 17.5 | 12.5 | 37 | 36.2 |
|  | 100 | 9.8 |  | 100 | 27.7 |
|  | 1,000 | 5.6 |  | 1,000 | 22.6 |

Since density and viscosity vary with temperature the above tables of data are provided with respect to various temperatures to illustrate the variations of the data which can be expected with variations of temperature. However, a given hydrocarbon mixture having a characterization factor determined at any given temperature will have the same, or nearly the same, characterization factor when determined at any other temperature.

I have found that the following equation best relates the characterization factor to the density and viscosity of the hydrocarbon mixture:

$$K = A + BG + \frac{C}{V_s} \qquad (2)$$

where:

K = the Watson-Nelson characterization factor of the hydrocarbon mixture;
$V_s$ = the Saybolt Universal viscosity of the hydorcarbon mixture;
G = the API gravity of the hydrocarbon mixture at 60° F.; and
A, B, and C are constants.

Relationships similar to Equation 2 can be drawn using any other measures of density and viscosity such as specific gravity and absolute viscosity. However, the expression in terms of API gravity and Saybolt Universal viscosity results in a simplified and convenient equation. The constants A, B, and C depend upon the temperature of the hydrocarbon mixture in reference to which the gravity and viscosity are measured. Also, the gravity term G, in the equation, is the API gravity of the hydrocarbon mixture corrected to a temperature of 60° F., whereas the viscosity term $V_s$ is the viscosity measured at any convenient temperature. The variations of viscosity with temperature are compensated for by the constants A, B, and C.

One simple manner of obtaining on-stream density and viscosity information, useable in connection with refinery process, is to use on-stream instrumentation available in the prior art for measuring specific gravity and absolute viscosity. The specific gravity and absolute viscosity thus obtained can then be converted to API gravity and Saybolt University viscosity for use in Equation 2 above. For the API gravity conversion the following equations are used.

$$G = \frac{141.5}{S_2} - 131.5 \qquad (3)$$

and:

$$S_2 = R + WS_1 \qquad (4)$$

where:

G = API gravity;
$S_1$ = the measured specific gravity at any convenient stream temperature;
$S_2$ = the scpecific gravity at 60° F.; and
R and W are constants related to stream temperature.

For the viscosity conversion the following equation is used:

$$V_s = \frac{\frac{V_a}{S_1} + \left[\left(\frac{V_a}{S_1}\right)^2 + M\right]^{1/2}}{0.438} \quad (5)$$

where:
$V_s$ = the Saybolt Universal viscosity;
$V_a$ = the absolution viscosity measured at the stream temperature; and
M is a constant related to the stream temperature.

The purpose of Equation 4 above is to convert the measured specific gravity to a specific gravity at the standard temperature of 60° F. Since the variation of specific gravity with temperature is far less than the variation of viscosity with temperature, the use of Equation 4 can be omitted with some compromise in accuracy. Its use, however, is preferred. Also, for best accuracy it is preferred that the specific gravity and viscosity be measured at the same, or near same, stream temperatures.

The use of Equations 2 through 5 to solve for the Watson-Nelson characterization factor can be summarized as follows: The specific gravity and absolute viscosity of the hydrocarbon mixture are measured on-stream at a convenient temperature. Equations 3 through 5 are used to solve for G and $V_s$ which are, in turn, substituted in Equation 2 to solve for K.

Figure 2:
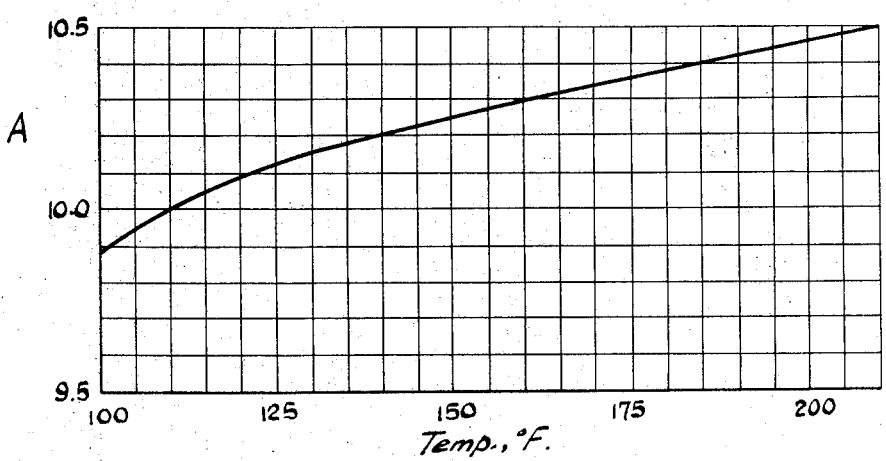
Figure 4:
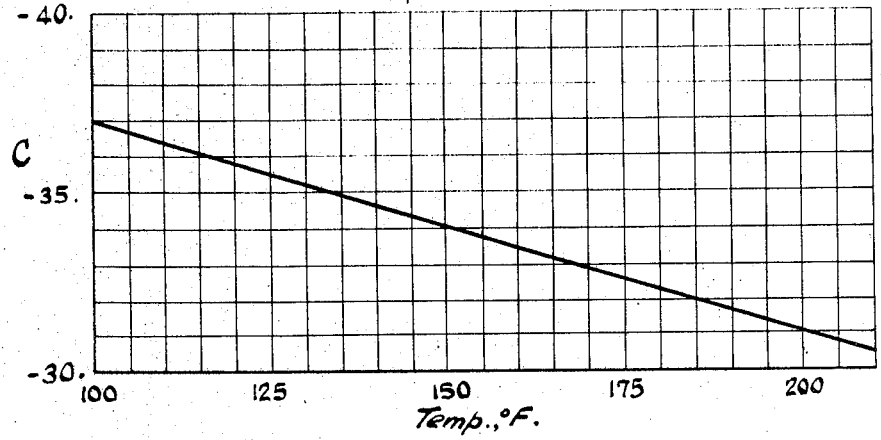
Figure 5:
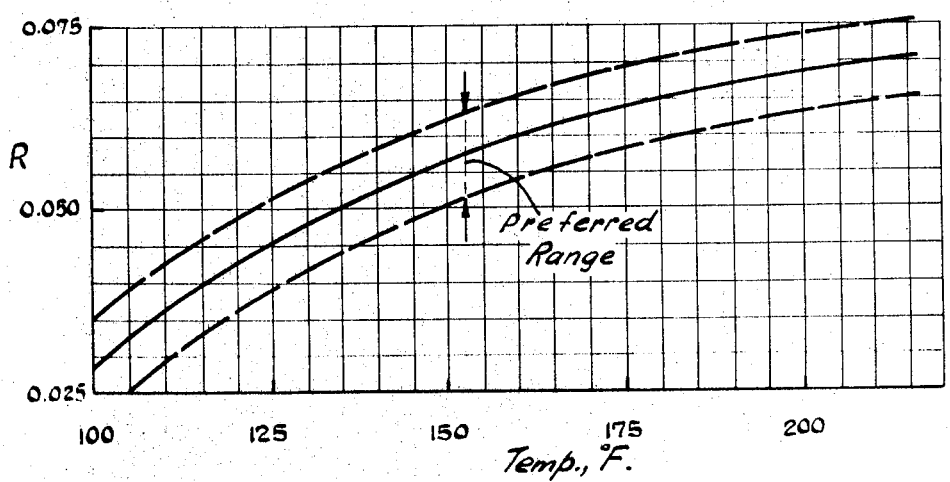
Figure 6:
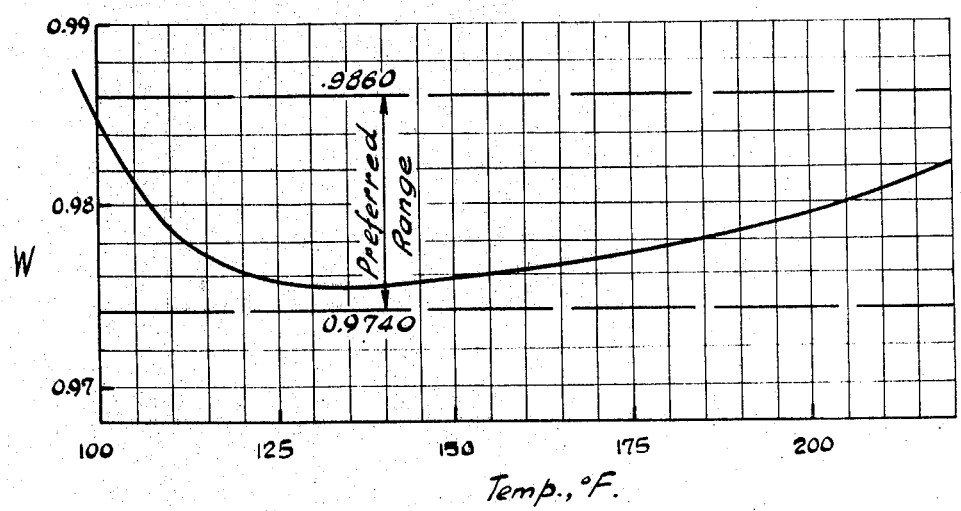

The numeric value of the constants A, B, and C in Equation 2 depend upon the stream temperature. I have determined these values empirically and they are illustrated as functions of temperature in FIGS. 2, 3, and 4, respectively. Also, FIGS. 5, 6, and 7 illustrate the values of R, W, and M as fuctions of temperature.

There are three stream temperatures, among others, which are convenient in connection with many petroleum refining processes. For these temperatures I have abstracted from the data of the curves of FIGS. 2 through 7 the following table.

conduit 10 is a viscosity sensing instrument 13, which similarly receives a small side stream of the hydrocarbon mixture through a conduit 14, which is in turn returned to the conduit 10 after passing through the latter instrument. The viscosity instrument 13 is of the vibrating probe type which includes output electronics for providing a signal corresponding to the viscosity of the sampled side stream. To provide the above signals suitable measuring instruments have been found to be the Dynatrol CL–10TY Series density cell and the Dynatrol CL–10RV Series viscosity detector. Both instruments are manufactured by Automation Products, Inc., Houston, Tex.

The specific gravity and absolute viscosity signals, from the sensors 11, 13, are carried by suitable signal carrying means to a conventional analog division device 15 which divides the latter signal by the former and provides an analog output signal corresponding to the quotient, namely, $V_a/S_1$. A suitable analog device which can be used to perform the division is that manufactured by Electronic Associates Inc., Long Branch, N.J., under the designation Pace PC–12 Quarter Square Multiplier, Type 7.081. The quotient signal, from the analog division device 15, is carried to a conventional analog squaring device 16 which provides an output signal corresponding to the square of its input signal, namely, $$\left(\frac{V_a}{S_1}\right)^2$$

For this purpose a second multiplier, the same as specified above for the device 15, can be used. The signal from the squaring device 16 is, in turn, carried to a conventional analog addition device 17 which adds the constant M, to its input signal, and provides an analog output signal corresponding to this sum. For this purpose an analog addition device similar to that manufactured by Electronic Associates Inc. under the designation Pace PC–12 Operational Amplifier, Type 6.368, and Amplifier Network, Type 12.782, can be used coupled to a potentiometer and regulated voltage source, not shown. By manual operation of the potentiometer the constant M can be entered into the system pursuant to its selection from the curve of FIG. 7. The sum signal, from the addition device 17, is carried to a conventional analog square root device 18

TABLE IV

| | 100° F. | | | 122° F. | | | 210° F. | | |
|---|---|---|---|---|---|---|---|---|---|
| | Low | High | Preferred | Low | High | Preferred | Low | High | Preferred |
| A | 9.80 | 10.10 | 9.88 | 10.00 | 10.20 | 10.10 | 10.40 | 10.60 | 10.50 |
| B | .075 | .095 | +.085 | .075 | .095 | .083 | .078 | .088 | .083 |
| C | −29 | −46 | −37.0 | −26 | −45 | −35.7 | −25 | −35 | −30.5 |
| R | .020 | .035 | .0279 | .032 | .050 | .0427 | .063 | .075 | .0687 |
| W | .9740 | .9860 | .9845 | .9740 | .9860 | .9759 | .9740 | .9860 | .980 |
| M | 150 | 160 | 155 | 150 | 160 | 155 | 155 | 165 | 160 |

The preferred values are those values most likely to produce the most accurate results. The low and high values define the ranges in which acceptable accuracies result and which include the uncertainties in the empirical determination of the quantities.

Referring now to FIG. 1, which is a block diagram schematic illustrating an example of a system which can be used to practice the invention, there is shown a conduit 10 carrying a typical refinery process hydrocarbon stream, such as a petroleum crude, or petroleum fraction. There is connected to the conduit 10 a density sensing instrument 11 which receives a small side stream of the hydrocarbon mixture through a conduit 12. The side stream is in turn returned to the conduit 10 after passing through the density sensing instrument. The instrument 11 is of the vibrating density cell type which includes output electronics for providing a signal corresponding to the specific gravity of the sample side stream. Also connected to the which provides an analog signal corresponding to the square root of its input signal, namely $$\left[\left(\frac{V_a}{S_1}\right)^2 + M\right]^{1/2}$$

The latter signal is in turn carried to a conventional analog addition device 19 which is similar to the analog addition device 17. Also carried to the analog addition device 19 is the quotient signal from the analog division device 15. The analog addition device 19 provides an output signal corresponding to the sum of its two input signals. This sum signal is in turn carried to a conventional analog division device 20 where the latter signal is divided by the constant .438. The analog division device 20 can be a simple D.C. amplifier having a gain factor adjusted to correspond to the division of its input signal by the constant .438. It can be seen that the output signal provided by the analog division device 20 corresponds to the Saybolt Universal viscosity, $V_s$, of the hydrocarbon mixture, in accordance with Equation 5 above.

The specific gravity signal, from the sensing instrument 11, is also carried to a conventional analog multiplication device 25, which multiplies the specific gravity signal by the constant W and provides an output signal corresponding to this product. The analog multiplication device 25 can be a simple D.C. amplifier incorporating a manually adjustable gain feature such as a potentiometer in its feedback circuit. By manual operation of such a potentiometer the multiplication device can be adjusted to apply the proper value of the constant W which is selected from the curve of FIG. 6. The product signal, thus developed, is carried to a conventional analog addition device 26 which adds to this product signal the constant R. The analog addition device 26 is similar in construction to the addition device 17 including a manual entry provision for entering into the system the value R which is selected from the curve of FIG. 5. It can be seen that the sum signal provided by the analog addition device 26 corresponds to the specific gravity of the hydrocarbon mixture corrected to a standard temperature of 60° F. The devices 25 and 26 can be omitted if one is prepared to accept a compromise in the accuracy of the system, by not correcting the specific gravity to the standard temperature, or, if the temperature of the hydrocarbon mixture is maintained in the vicinity of 60° F.

The specific gravity signal $S_2$ is carried from the analog addition device 26 to a conventional analog division device 27 which divides the constant 141.5 by the specific gravity signal $S_2$. The quotient signal from the analog division device 27 is, in turn, carried to a conventional analog subtraction device 28 which is adapted to subtract the constant 131.5 from the latter quotient signal and provides an output signal corresponding to this difference. It can be seen from Equation 3, above, that the output signal of the subtraction device 28 corresponds to the API gravity, G, of the hydrocarbon mixture.

Figure 3:
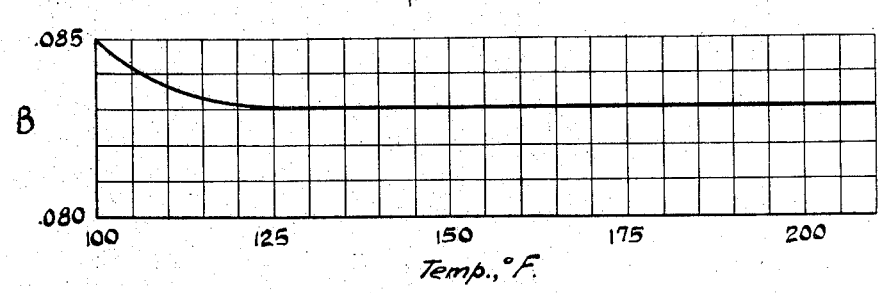

The API gravity signal G from the analog subtraction device 28 is carried to a conventional analog multiplication device 30 which is adapted to multiply the gravity signal by the constant B selected from the curve of FIG. 3. The multiplication device 30 can be a simple D.C. amplifier incorporating a suitable manually operable gain adjustment provision, such as a potentiometer in its feedback circuit, so that the appropriate value of the constant B can be entered into the system. The output signal provided by the latter device corresponds to the product BG. This signal is in turn carried to a conventional analog addition device 31 which is adapted to sum three input signals as discussed below.

The viscosity signal $V_s$, provided by the analog division device 20, is carried to a conventional analog division device 35 which is adapted to divide the constant C by the viscosity signal $V_s$. For this purpose a division device the same as that described above as the analog division device 15 can be used coupled to a potentiometer and regulated voltage source whereby the value C can be entered into the system pursuant to its selection from the curve of FIG. 4. The quotient signal provided by the analog division device 35 is, in turn, carried to the analog addition device 31. Also connected with the analog division device 31 is a potentiometer 36, which is, in turn, connected to a regulated voltage source, not shown. The potentiometer 36 is manually set to provide a signal proportional to the constant A, of Equation 2 above, which is selected from the curve of FIG. 2. This signal is carried to the analog addition device 31. The analog addition device 31 sums its three input signals and provides an output signal corresponding to this sum. A suitable addition device that can be used for this purpose is manufactured by Electronics Associates Inc., Long Branch, N.J., under the designation of a Pace PC–12 Operational Amplifier, Type 6.368 coupled with two Amplifier Networks, Type 12.782.

It can be seen that the output signal from the analog addition device 31 corresponds to the Watson-Nelson characterization factor, K, in accordance with Equation 2 above. This signal is, in turn, carried to a suitable display device 37, such as a chart recorder or a display meter, where the signal can be observed or recorded. The characterization factor signal can also be transmitted to upstream processing units where it can be utilized to perform control functions such as the automatic segregation of the products of crude distillation for selected uses.

In summary, the system is set up as follows. The temperature of the hydrocarbon is first established and the values of the constants A, B, C, R, W, and M are selected from the curves of the appended drawings, or from Table IV above. These values are then entered into the various manually adjusted components of the system as discussed above. The system is then in a proper set-up to provide continuous on-stream monitoring of the characterization factor K.

It can be appreciated by those skilled in the art that while electrical analog computing elements have been described, equivalent computation elements can be used, such as those of the pneumatic type, resulting in an equivalently operable system. It can also be appreciated by those skilled in the art that a digital computer can be utilized to perform the various computation steps. In this instance the values of the constants A, B, C, R, W, and M would be pre-programmed in the computer, or the information of the curves of FIGS. 2 through 7 would be pre-programmed, and information of the hydrocarbon temperature would be made available to the computer. Also, the sensing instruments 11 and 13 would be adapted to provide their respective signals in digital format. The advantage of the use of a digital computer lies, of course, in its accuracy and speed.

While the invention has been described with a certain degree of particularity, it can, nevertheless, be seen by the examples hereinabove set forth, that many modifications and variations of the invention can be made without departing from the spirit and scope thereof.

I claim:

1. A method for generating a signal representative of the Watson-Nelson characterization factor of a hydrocarbon mixture comprising the steps of:
   (a) sensing a physical property of said hydrocarbon mixture representative of the viscosity thereof and providing a first signal representative of said viscosity;
   (b) sensing a physical property of said hydrocarbon mixture representative of the gravity of said mixture and providing a second signal representative of said gravity; and
   (c) deriving a third signal representative of said characterization factor by combining said first and second signals in accordance with a predetermined empirical relationship relating said characterization factor with said viscosity and said gravity of said hydrocarbon mixture.

2. The method of claim 1 wherein said first and second signal providing steps include providing said first and second signals representative of the Saybolt Universal viscosity and the API gravity, respectively, of said hydrocarbon mixture, and wherein said combining step (c) comprises:
   (c) combining said first second signals to provide said third signal representative of said characterization factor, said combining being performed in accordance with said predetermined relationship relating said Saybolt Universal viscosity and said API gravity with said characterization factor, the general form of said relationship being substantially in accordance with the following equation:

$$K = A + BG + \frac{C}{V_s}$$

where:
- K = the Watson-Nelson characterization factor of said hydrocarbon mixture,
- $V_s$ = the Saybolt Universal viscosity of said hydrocarbon mixture,
- G = the API gravity of said hydrocarbon mixture, and
- A, B, and C are predetermined constants related to the temperature of said hydrocarbon mixture.

3. The method of claim 2 wherein the temperature of said hydrocarbon mixture is maintained substantially constant and in the range of about 100° F. to about 210° F. at least in part during said first and second sensing steps and wherein the numeric values of said constants A, B, and C are predetermined empirically in accordance with said constant temperature.

4. The method of claim 2 wherein said first and second signals are provided with reference to a temperature of said hydrocarbon mixture of about 100° F., wherein the numeric value of said constant A is in the range of about 9.80 to 10.10, wherein the numeric value of said constant B is in the range of about .075 to .095, and wherein the numeric value of said constant C is in the range of about −29 to −46.

5. The method of claim 2 wherein said first and second signals are provided with reference to a temperature of said hydrocarbon mixture of about 122° F., wherein the numeric value of said constant A is in the range of about 10.00 to 10.20, wherein the numeric value of said constant B is in the range of about 0.75 to .095, and wherein the numeric value of said constant C is in the range of about −26 to −45.

6. The method of claim 2 wherein said first and second signals are provided with reference to a temperature of said hydrocarbon mixture of about 210° F., wherein the numeric value of said constant A is in the range of about 10.40 to 10.60, wherein the numeric value of said constant B is in the range of about .078 to .088 and wherein the numeric value of said constant C is in the range of about −25 to −35.

7. The method of claim 2 wherein the temperature of said hydrocarbon mixture is maintained substantially constant and in the range of about 100° F. to about 200° F. at least in part during said first and second sensing steps, wherein the numeric values of said constants A, B, and C are predetermined empirically in accordance with said constant temperature, and wherein said combining step (c) comprises the steps of:
  (ca) providing a quotient fourth signal corresponding to the quotient of said constant C divided by said Saybolt viscosity first signal;
  (cb) providing a product fifth signal corresponding to the product of said API gravity second signal multiplied by said constant B;
  (cc) providing a sixth signal corresponding to said constant A; and
  (cb) providing a product fifth signal corresponding to Watson-Nelson characterization factor of said hydrocarbon mixture by providing said third signal to correspond to the sum of said fourth, fifth, and sixth signals.

8. The method of claim 2 wherein said sensing and second signal providing step (b) comprises the steps of:
  (ba) sensing the specific gravity of said hydrocarbon mixture and providing a specific gravity seventh signal corresponding thereto; and
  (bb) providing said second signal corresponding to said API grivity of said hydrocarbon mixture in response to said seventh signal and substantially in accordance with the following equation:

$$G = \frac{141.5}{S} - 131.5$$

where:
- G = the API gravity of said hydrocarbon mixture, and
- S = the specific gravity of said hydrocarbon mixture.

9. The method of claim 8 wherein the temperature of said hydrocarbon mixture is in the range of about 100° F. to about 200° F. at least in part during said specific gravity sensing step (ba) and wherein said seventh signal of said step (ba) is provided substantially in accordance with the following equation:

$$S = R + WS_1$$

where:
- $S_1$ = the sensed specific gravity of said hydrocarbon mixture,
- S = the specific gravity of said hydrocarbon mixture corrected in reference to a temperature of said mixture of about 60° F., and
- R and W are constants the numeric value of which are predetermined empirically in accordance with the temperature of said hydrocarbon mixture.

10. The method of claim 8 wherein said sensing and first signal providing step (a) comprises the steps of:
  (aa) sensing the absolute viscosity of said hydrocarbon mixture and providing an absolute viscosity eighth signal corresponding thereto; and
  (ab) providing said first signal corresponding to said Saybolt Universal viscosity of said hydrocarbon mixture in response to a ninth signal and substantially in accordance with the following equation:

$$V_s = \frac{\frac{V_a}{S} + \left[\left(\frac{V_a}{S}\right)^2 + M\right]^{1/2}}{.438}$$

where:
- $V_s$ = the Saybolt Universal viscosity of said hydrocarbon mixture;
- $V_a$ = the absolute viscosity of said hydrocarbon mixture in acordance with said viscosity eighth signal;
- S = the specific gravity of said hydrocarbon mixture in accordance with said specific gravity seventh signal; and
- M = a constant empirically related to the temperature of said hydrocarbon mixture.

11. Apparatus for generating a signal representative of the Watson-Nelson characterization factor of a hydrocarbon mixture from a source thereof comprising:
  (a) first means operatively coupled with said source of said hydrocarbon mixture for sensing a physical property thereof representative of the viscosity of said hydrocarbon mixture and for providing a first signal representative of said viscosity;
  (b) second means operatively coupled with said source of said hydrocarbon mixture for sensing a physical property thereof representative of the gravity of said hydrocarbon mixture and for providing a second signal representative of said gravity; and
  (c) third means operatively coupled with said first and second means for deriving a third signal representative of said characterization factor by combining said first and second signals in accordance with a predetermined empirical relationship relating said characterization factor with said viscosity and said gravity of said hydrocarbon mixture.

12. Apparatus for generating a signal representative of the Watson-Nelson characterization factor or a hydrocarbon mixture from a source thereof wherein said mixture is at a temperature in the range of about 100° F. to about 210° F., comprising:
  (a) first means operatively coupled with said source of said hydrocarbon mixture for sensing a physical property thereof representative of the viscosity of said hydrocarbon mixture and for providing a first signal representative of the Saybolt Universal viscosity of said hydrocarbon mixture;

(b) second means operatively coupled with said source of said hydrocarbon mixture for sensing a physical property thereof representative of the gravity of said hydrocarbon mixture and for providing a second signal representative of the API gravity of said hydrocarbon mixture; and (c) third means operatively coupled with said first and second means for combining said first and second signals to provide a third signal representative of said characterization factor, said combining means including computing means for combining said first and second signals substantially in accordance with the following equation:

$$K = A + BG + \frac{C}{V_s}$$

where:
K=the Watson-Nelson characterization factor of said hydrocarbon mixture;
$V_s$=the Saybolt Universal viscosity of said hydrocarbon mixture;
G=the API gravity of said hydrocarbon mixture, and A, B, and C are constants the numeric values of which are empirically determined in accordance with the temperature of said hydrocarbon mixture.

13. The apparatus of claim 12 wherein said second means (b) comprises:

(ba) means including a gravity sensor connected with said source of said hydrocarbon mixture for sensing the specific gravity of said hydrocarbon mixture and for providing a specific gravity signal representative thereof; and (bb) computing means operatively coupled with said last named means (ba) for computing the API gravity of said hydrocarbon mixture and for providing said second signal representative of said API gravity substantially in accordance with the following equation:

$$G = \frac{141.5}{S} - 131.5$$

where:
G=the API gravity of said hydrocarbon mixture, and
S=the specific gravity of said hydrocarbon mixture.

14. The apparatus of claim 13 wherein said first means (a) comprises:

(aa) means including a viscosity sensor connected with said source of said hydrocarbon mixture for sensing the absolute viscosity of said hydrocarbon mixture and for providing a viscosity signal representative thereof; and (ab) computing means operatively coupled with said last named means (aa) for computing the Saybolt Universal viscosity of said hydrocarbon mixture and for providing said first signal representative of said Saybolt Universal viscosity substantially in accordance with the following equation:

$$V_s = \frac{\frac{V_a}{S} + \left[\left(\frac{V_a}{S}\right)^2 + M\right]^{1/2}}{.438}$$

where:
$V_s$=the Saybolt Universal viscosity of said hydrocarbon mixture;
$V_a$=the absolute viscosity of said hydrocarbon mixture in accordance with said viscosity signal;
S=the specific gravity of said hydrocarbon mixture in accordance with said specifice gravity signal; and
M=a predetermined constant empirically related to the temperature of said hydrocarbon mixture.

15. The apparatus of claim 14 wherein said third means (c) comprises:

(ca) division means, operatively coupled with said viscosity computing means (ab), for providing a quotient fourth signal corresponding to the quotient of said constant C divided by said Saybolt viscosity first signal;

(cb) multiplication means operatively coupled with said gravity computing means (bb), for providing a product fifth signal corresponding to the product of said API gravity second signal multiplied by said constant B;

(cc) signal generating means for generating a sixth signal corresponding to said constant A; and (cd) signal summing means operatively coupled with said division means (ca), with said multiplication means (cb), and operatively coupled with said signal generating means (cc), for providing a third signal corresponding to the sum of said fourth, fifth, and sixth signals, said third signal thereby cooresponding to said Watson-Nelson characterization factor of said hydrocarbon mixture.

References Cited
UNITED STATES PATENTS

| | | | |
|---|---|---|---|
| 2,357,003 | 8/1944 | Hurndall | 73—32X |
| 3,145,559 | 8/1964 | Banks | 73—32 |
| 3,433,057 | 3/1969 | Halsey | 73—32X |

LOUIS R. PRINCE, Primary Examiner

J. W. ROSKOS, Assistant Examiner

U.S. Cl. X.R.

73—32, 54

PO-1050
(5/69)

UNITED STATES PATENT OFFICE
CERTIFICATE OF CORRECTION

Patent No. 3,557,609  Dated January 26, 1971

Inventor(s) Robert A. Woodle

It is certified that error appears in the above-identified patent and that said Letters Patent are hereby corrected as shown below:

| | | |
|---|---|---|
| Column 4 | Table II | change "R" to read -- K -- |
| Column 4 | line 64 | change "process" to read -- processe |
| Column 5 | Table IV | under "100°F" column "Preferred" line "B" delete the "+" |
| Column 5 | line 75 | change "sample" to read -- sampled - |
| Column 9 | line 58 (Claim 7) | change "cb" to read -- cd --, and cancel "a product fifth" and substitute -- said third --, also after "to" (at the end of the line) add -- said --. |
| Column 9 | line 68 (Claim 8) | change "grivity" to read -- gravity |
| Column 10 | line 65 (Claim 12, line 2) | change "or" to read -- of --. |
| Column 12 | line 14 (opposite line marked 18) | change "specifice" to read -- specific --. |

Signed and sealed this 18th day of January 1972.

(SEAL)
Attest:

EDWARD M. FLETCHER, JR.　　　　ROBERT GOTTSCHALK
Attesting Officer　　　　　　　　Acting Commissioner of Pater